United States Patent
Purtle et al.

(10) Patent No.: US 7,709,041 B2
(45) Date of Patent: May 4, 2010

(54) LOW-FAT COCOA POWDER

(75) Inventors: Ian C. Purtle, Plymouth, MN (US);
Todd W. Gusek, Crystal, MN (US);
Bassam F. Jirjis, Savage, MN (US);
Frans W. Boddenheim, Dodaars (NL)

(73) Assignee: Cargill, Incorporated, Wayzata, MN (US)

( * ) Notice: Subject to any disclaimer, the term of this patent is extended or adjusted under 35 U.S.C. 154(b) by 561 days.

(21) Appl. No.: 11/236,415

(22) Filed: Sep. 27, 2005

(65) Prior Publication Data
US 2006/0198932 A1 Sep. 7, 2006

Related U.S. Application Data

(63) Continuation of application No. 10/465,539, filed on Jun. 19, 2003, now abandoned, which is a continuation of application No. 09/997,726, filed on Nov. 29, 2001, now Pat. No. 6,610,343, which is a continuation of application No. 09/426,481, filed on Oct. 26, 1999, now Pat. No. 6,361,814, which is a continuation of application No. 08/796,932, filed on Feb. 7, 1997, now Pat. No. 6,066,350.

(51) Int. Cl.
*A23L 1/10* (2006.01)
(52) U.S. Cl. .................................. 426/631; 426/430
(58) Field of Classification Search .............. 426/631, 426/430
See application file for complete search history.

(56) References Cited

U.S. PATENT DOCUMENTS

| | | | |
|---|---|---|---|
| 1,660,541 A * | 2/1928 | Bollmann | 426/593 |
| 1,802,533 A | 4/1931 | Reid | |
| 1,849,886 A | 3/1932 | Rosenthal | |
| 2,247,851 A | 7/1941 | Rosenthal | |
| 2,281,865 A | 5/1942 | Van Dijck | |
| 2,538,007 A | 1/1951 | Kester | |
| 2,548,434 A | 4/1951 | Leaders | |
| 2,560,935 A | 7/1951 | Dickinson | |
| 2,564,409 A | 8/1951 | Rubin | |
| 2,682,551 A | 6/1954 | Miller | |
| 2,727,914 A | 12/1955 | Gastrock et al. | |
| 3,053,663 A | 9/1962 | Donahue | |
| 3,261,690 A | 7/1966 | Wayne | |
| 3,560,218 A | 2/1971 | Whelan | |
| 3,754,928 A | 8/1973 | Haney | |

(Continued)

FOREIGN PATENT DOCUMENTS

CA 840382 4/1970

(Continued)

OTHER PUBLICATIONS

ADM Coco, "There's a Century of Experience in Every Product", Presentation Folder and Materials.

(Continued)

*Primary Examiner*—Anthony Weier

(57) ABSTRACT

Techniques for processing cocoa mass are provided. In general, the techniques involve solvent extraction of cocoa fat from cocoa mass, to achieve a desirable cocoa butter and low-fat cocoa powder. In one preferred process, the cocoa mass is the result of grinding cocoa nibs, with absence of a mechanical pressing and heating step, to advantage. Preferred products and uses are characterized.

4 Claims, 2 Drawing Sheets

U.S. PATENT DOCUMENTS

| | | | |
|---|---|---|---|
| 3,923,847 A | 12/1975 | Roselius et al. | |
| 3,939,281 A | 2/1976 | Schwengers | |
| 3,966,981 A | 6/1976 | Schultz | |
| 3,966,982 A | 6/1976 | Becker et al. | |
| 3,985,607 A | 10/1976 | Schmitt | |
| 3,987,138 A | 10/1976 | Hege | |
| 4,156,030 A | 5/1979 | Eggen | |
| 4,156,743 A | 5/1979 | Schmitt | |
| 4,164,594 A | 8/1979 | Jackson et al. | |
| 4,281,027 A | 7/1981 | Inoue et al. | |
| 4,331,695 A | 5/1982 | Zosel | |
| 4,343,818 A | 8/1982 | Eggen | |
| 4,349,579 A | 9/1982 | Raboud et al. | |
| 4,356,209 A * | 10/1982 | Bryan et al. | 426/627 |
| 4,375,387 A | 3/1983 | deFilippi et al. | |
| 4,406,778 A | 9/1983 | Borza et al. | |
| 4,434,028 A | 2/1984 | Eppig et al. | |
| 4,438,681 A | 3/1984 | Raboud et al. | |
| 4,444,798 A | 4/1984 | Magnolato et al. | |
| 4,504,503 A | 3/1985 | Biernoth et al. | |
| 4,522,707 A | 6/1985 | Kriegel et al. | |
| 4,547,292 A | 10/1985 | Zarchy | |
| 4,554,170 A | 11/1985 | Panzner et al. | |
| 4,617,177 A | 10/1986 | Schumacher | |
| 4,633,775 A | 1/1987 | Kruiver | |
| 4,675,133 A | 6/1987 | Eggers et al. | |
| 4,675,198 A | 6/1987 | Sevenants | |
| 4,744,926 A | 5/1988 | Rice | |
| 4,765,257 A | 8/1988 | Abrishamian et al. | |
| 4,770,780 A | 9/1988 | Moses | |
| 4,784,866 A | 11/1988 | Wissgott | |
| 4,797,198 A | 1/1989 | Wetzel et al. | |
| 4,848,918 A | 7/1989 | Kingsley et al. | |
| 4,861,607 A | 8/1989 | Margolis et al. | |
| 4,877,530 A | 10/1989 | Moses | |
| 4,898,673 A | 2/1990 | Rice et al. | |
| 4,948,600 A | 8/1990 | Zumbé et al. | |
| 5,009,917 A | 4/1991 | Wiant et al. | |
| 5,041,245 A | 8/1991 | Benado | |
| 5,114,730 A | 5/1992 | Ellis | |
| 5,139,799 A | 8/1992 | Palson et al. | |
| 5,178,889 A | 1/1993 | Reed et al. | |
| 5,185,175 A * | 2/1993 | Loh et al. | 426/631 |
| 5,186,817 A | 2/1993 | Paspek et al. | |
| 5,210,240 A | 5/1993 | Peter et al. | |
| 5,258,199 A | 11/1993 | Moore et al. | |
| 5,281,732 A | 1/1994 | Franke | |
| 5,312,635 A | 5/1994 | Kazlas et al. | |
| 5,338,554 A | 8/1994 | Vogt et al. | |
| 5,389,394 A | 2/1995 | Weyersbach et al. | |
| 5,405,633 A | 4/1995 | Heidlas et al. | |
| 5,408,924 A | 4/1995 | Arendt et al. | |
| 5,445,841 A | 8/1995 | Arendt et al. | |
| 5,482,633 A | 1/1996 | Muraldihara et al. | |
| 5,516,923 A | 5/1996 | Hebert et al. | |
| 5,518,754 A | 5/1996 | Miller et al. | |
| 5,525,746 A | 6/1996 | Franke | |
| 5,554,645 A | 9/1996 | Romanczyk, Jr. et al. | |
| 5,616,359 A | 4/1997 | Heidlas et al. | |
| 5,620,728 A | 4/1997 | Langley et al. | |
| 5,626,756 A | 5/1997 | Heidlas et al. | |
| 5,707,673 A | 1/1998 | Prevost et al. | |
| 5,712,305 A | 1/1998 | Romanczyk, Jr. et al. | |
| 5,718,937 A | 2/1998 | Heidlas et al. | |
| 5,728,851 A | 3/1998 | Franke et al. | |
| 5,739,364 A | 4/1998 | Franke | |
| 5,753,296 A * | 5/1998 | Girsh | 426/593 |
| 5,783,243 A | 7/1998 | Benado | |
| 5,919,502 A | 7/1999 | Manez et al. | |
| 6,015,913 A | 1/2000 | Kealey et al. | |
| 6,066,350 A | 5/2000 | Purtle et al. | |
| 6,172,246 B1 | 1/2001 | Franke | |
| 6,361,814 B2 | 3/2002 | Purtle et al. | |
| 6,610,343 B2 | 8/2003 | Purtle et al. | |
| 2002/0127316 A1 | 9/2002 | Trout | |
| 2004/0071847 A1 | 4/2004 | Jirjis et al. | |
| 2004/0071848 A1 | 4/2004 | Gusek et al. | |
| 2004/0071858 A1 | 4/2004 | Nijhuis et al. | |

FOREIGN PATENT DOCUMENTS

| | | |
|---|---|---|
| CA | 1219764 | 3/1987 |
| CA | 2059829 | 7/1992 |
| CA | 2165387 | 6/1996 |
| CN | 1050739 A | 4/1991 |
| DE | 1 934 649 | 1/1971 |
| DE | 2055030 | 5/1972 |
| DE | 25 57 056 A1 | 6/1977 |
| DE | 2828992 | 8/1979 |
| DE | 3318317 A1 | 11/1984 |
| DE | 3716227 | 12/1988 |
| DE | 3901056 A1 | 7/1990 |
| DE | 41 39 817 A1 | 6/1993 |
| EP | 0 061 017 A2 | 9/1982 |
| EP | 0 171 079 A2 | 2/1986 |
| EP | 0 254 610 | 1/1988 |
| EP | 0 379 023 A1 | 7/1990 |
| EP | 0 496 310 A1 | 7/1992 |
| EP | 0 252 760 B1 | 3/1993 |
| EP | 0 574 764 A3 | 12/1993 |
| EP | 0 593 833 A1 | 4/1994 |
| EP | 0 664 959 B1 | 8/1995 |
| EP | 0 719 854 A2 | 7/1996 |
| EP | 0 721 980 A2 | 7/1996 |
| EP | 0 591 981 B1 | 12/1996 |
| EP | 0 943 675 | 9/1999 |
| EP | 0 711 508 B1 | 7/2000 |
| FR | 1 274 872 | 10/1961 |
| GB | 341000 | 1/1931 |
| GB | 652619 | 4/1951 |
| GB | 742537 | 12/1953 |
| GB | 770843 | 3/1957 |
| GB | 1356749 | 6/1974 |
| GB | 1356750 | 6/1974 |
| GB | 2 033 721 A | 5/1980 |
| GB | 2 148 739 A | 6/1985 |
| GB | 2177107 | 1/1987 |
| JP | 53066473 | 6/1978 |
| JP | 54157880 | 12/1979 |
| JP | 55-135546 A | 10/1980 |
| JP | 58146238 | 8/1983 |
| JP | 59091845 | 5/1984 |
| JP | 62104554 | 5/1987 |
| JP | 62126966 | 6/1987 |
| JP | 61-116926 | 11/1987 |
| JP | 62272941 A | 11/1987 |
| JP | 1-56793 (A) | 3/1989 |
| JP | 01112965 A | 5/1989 |
| JP | 1-243942 (A) | 9/1989 |
| JP | 3155748 | 7/1991 |
| JP | 06086637 A | 3/1994 |
| JP | 7087892 | 4/1995 |
| JP | 7087893 | 4/1995 |
| JP | 9-234018 A | 9/1997 |
| JP | 9275905 | 10/1997 |
| JP | 10-179078 A | 7/1998 |
| JP | 11-155985 | 12/2000 |
| SU | 210300 | 4/1968 |
| WO | WO 93/13035 | 7/1993 |
| WO | WO 94/15483 | 7/1994 |
| WO | WO 95/03708 | 2/1995 |
| WO | WO 95/10946 | 4/1995 |
| WO | WO 96/34535 A1 | 11/1996 |
| WO | WO 02/071858 A1 | 9/2002 |

ZA 881378 2/1988

OTHER PUBLICATIONS

Arruda et al., "Phospholipid Composition of Lipid Seed Crystal Isolates from Ivory Coast Cocoa Butter", JAOCS, 68(6) 385-390 (Jun. 1991).
Author Unknown, "Cadbury Schweppes' New Cocoa Processing Factory at Chirk", *Food Trade Review*, 39(11):43-46 (Nov. 1969).
Author Unknown, "New Fat Solvent System", *International Food Manufacture*, 13(4):18 (1996).
Bendsorp and Cocoa, Cocoa Powder, Cocoa Butter, Vending Machine Cocoa, Informational Booklet.
Bendsorp Cocoa/Chocolate, Defatted Powders, Holland Quality & Expertise, Booklet and Recipe.
Bendsorp, Cocoa butter; Defatted cocoa powder; Production of cocoa powder and cocoa press butter.
Bioseparations, Inc., Confidential Presentation Materials, "Specialty Grain Extraction Project" (1992).
Brochure, Pannevis: Solid Liquid Separation, Pannevis Inc., Fairfield, New Jersey.
Burger, Sensory Evaluation Techniques for Chocolate with Different types of Cocoa Butter Products', The Manufacturing Confectioner, 58-60 *(Oct. 1992).
Chaiseri et al., "Lipid and Hardness Characteristics of Cocoa Butters from Different Geographic Regions", JAOCS, 66(11): 1771-1776.
Chaiseri et al., "Cocoa Butter—Its Composition and Properties", *The Manufacturing Confectioner*, 115-122 (Sep. 1987).
Clarke, "Supercritical Fluid Extraction Technology for Fat Reduction," *Proceedings*, pp. 101-107 (Jun. 9-12, 1991).
*Confectionery Production*, Physical Constants of Cocoa Powder and Cocoa Butter,, 425-433 (Jul. 1971).
Demetrakakes, "Sweet Charity", *Food Processing*, 87-92 (May 1997).
DeZaan, "Defatted S Helping you Make the Most of Cocoa" Brochure.
DeZaan, "Cocoa Powder Color Matrix" (1993).
ED & F Man Cocoa Limited, E D & F Man Cocoa Products, Promotional Brochure.
*Emerging Food R & D Report*, "Process defats and stabilizes rice bran and produces rice oil" (Mar. 1996).
*Federal Register*, 62 (46) 10781-10786, Department of Health and Human Services, Food and Drug Administration, 21 CFR Part 163 "White Chocolate; Proposal to Establish a Standard of Identity" (Mar. 10, 1997).
*Food Engineering*, "Removing Fat Via Liquified Gas-Solvent Extraction", pp. 27-28 (Jul./Aug. 1996).
*Food Technology*, Food Expo in Print, Aug. 1996, p. 74.
*Food Technology* Food Expo in Print, Aug. 1996, p. 102.
Ghizzoni et al., "Composition of Volatile Fraction of Industrial Chocolate", *Italian Food & Beverage Technology*, 3-13 (Mar. 1995).
Grace Cocoa, Chocolate Americas Division, "Grace Cocoa's Solution Source for Low Fat and Low Calories for Cocoa and Chocolate Containing Products", Presentation Folder and Materials.
Hashim et al., "Extraction and determination of methylpyrazines in Cocoa Beans Using Coupled Steam Distillation-Microdistillator", *Food Research International*, 27:537 544 (1994).
Heidlas, J.E., "Propane Extraction in Food Processing", *Food Marketing & Technology*, 8(6):38-40, 42-43 (Dec. 1994).
Jackson, "Recipes", *Industrial Chocoalte Manufacture and Use*, 15: 258-280 (1994).
Jeffery, "Chocolate Technology in 1997 and into the New Millennium", *The World of Ingredients*, 21-25.
Kaylegian, "Milkfat Fractions in Chocalate", *The Manufacturing Confectioner*, 79-84 (May 1997).

Keme, "Heat Treatment of Cocoa-Problems and Controlling", *The Manufacturing Confectioner*, 101-108 Jun. 1994).
LaBell, "Cocoa: A Bean of Many Flavors", *Prepared Foods*, 81 (Jul. 1997).
Lawler et al., PMCA Research Program at Penn State University, Progress Report submitted to The Research Committee of The Pennsylvania Manufacturing Confectioners Association (Apr. 28, 1996).
Lawler et al., PMCA Research Program at Penn State University, Progress Report submitted to The Research Committee of The Pennsylvania Manufacturing Confectioners Association (Nov. 7, 1995).
Lawler et al., PMCA Research Program at Penn State University, Progress Report submitted to The Research Committee of The Pennsylvania Manufacturing Confectioners Association (Apr. 23, 1995).
Li et al., "A New Industrial Process for Extracting Cocoa Butter and Xanthines with Supercritical Carbon Dioxide", JAOCS, 73(4) 423-429 (1996).
*Lipid Technology*, "New Extraction Procedure" (Jul. 1996).
Malssen et al., "Real-Time X-Ray Powder Diffraction Investigations on Cocoa Butter.I. Temperature-Dependent Crystallization Behavior", JAOCS, 73 (10):1209-1215 (1996).
Malssen et al., "Real-Time X-Ray Powder Diffraction Investigations on Cocoa Butter.II. The Relationship Between Melting Behavior and Composition of β-Cocoa Butter", JAOCS, 73 (10):12171223 (1996).
Malssen et al., "Real-Time X-Ray Powder Diffraction Investigations on Cocoa Butter. III. Direct β-Crystallization of Cocoa Butter: Occurrence of a Memory Effect", JAOCS, 73 (10): 1225-1230 (1996).
Meursing, "Cocoa Mass, Cocoa Butter, Cocoa Powder", *Industrial Chocolate Manufacture and Use* 6: 70-82 (1994).
Minife et al., "Solvent Extraction of Cocoa Butter" *Chocolate, Cocoa and Confectionery: Science and Technology*, 2:76-79.
Minson, "Chocolate Manufacture—Beans Through Liquior Production", *The Manufacturing Confectioner*, 61-67 (Nov. 1992).
Moates, et al., "Separating out the Value", *Food Science and Technology Today*, 4(4):213-214.
Morrison Knudsen Company, CF Systems, "Environmentally Sound Oil Extraction Process for the Food Industry", Promotional Brochure.
Parsons et al., "Phospholipid Concentration in Cocoa Butter and its Relationship to Viscosity in Dark Chocolate", Journal of the American of Oil Chemists' Society, 46 (8):425-4227 (1969).
Rossi et al., "Characterization of Cocoa Extracts Obtained with Supercritical Carbon Dioxide", *Ital. J. Food Sci.*, 3U: 41-50 (1989).
Schokinag, Folder and Presentation materials.
Shaughnessy, "Cocoa Beans—Planting Through Fementation-Its Effect on Flavor", *The Manufacturing Confectioner*, 51-58 (Nov. 1992).
Shukla, "Chocolate-the Chemistry of Pleasure", *INFORM*, 8(2):152-162 (Feb. 1997).
Stockwell, "Champion Chocolate", *Ingredient Technology*, 42-46 (Jul. 1996).
Supercritical Technology Consultants, Pamphlet and Insert.
Sutter et al., Supercritical Extraction, A New Industrial Technology, *Cienc. Tecnol. Ailiment.*, 14 (Suppl) 3-10, dez (1994).
Talbot, "Vegetable Fats", *Industrial Chocolate Manufacture and Use*, 14:242-249 (1994).
Urbanski, "Chocolate Flavor/Origins and Descriptions The Effects of Process and Bean Source", *The Manufacturing Confectioner*, 69-82 (Nov. 1992).
Urbanski, "Cocoa Roasting", *The Manufacturing Confectioner*, 58-62 (Nov. 1989).

* cited by examiner

LOW-FAT COCOA POWDER

This application is a Continuation of U.S. application Ser. No. 10/465,539, filed Jun. 19, 2003, now abandoned which is a Continuation of U.S. application Ser. No. 09/997,726, filed Nov. 29, 2001 (now U.S. Pat. No. 6,610,343), which is a Continuation of U.S. application Ser. No. 09/426,481, filed Oct. 26, 1999 (now U.S. Pat. No. 6,361,814), which is a Continuation of U.S . application Ser. No. 08/796,932, filed Feb. 7, 1997 (now U.S. Pat. No. 6,066,350), the disclosures of which are incorporated herein by reference.

FIELD OF THE INVENTION

The present invention relates to processing of cocoa. It particularly concerns processing cocoa mass to generate separated cocoa powder and cocoa butter, both at desirable quality levels and in desirable yields.

BACKGROUND OF THE INVENTION

Cocoa beans may be processed into cocoa butter and cocoa powder. Cocoa butter represents a portion of the fat content isolated from the cocoa beans. The cocoa powder represents remaining solids, after processing to recover cocoa butter.

Cocoa butters are widely utilized food additives. For example, cocoa butter is used in the production of chocolate. Cocoa powder is also used as a food additive for flavor and color, for example, to produce chocolate flavored milk, cake mixes and brownie mixes.

In general, cocoa beans are harvested in tropical countries. Beans from different regions do provide somewhat different tastes or characteristics. For example, for chocolate, many European manufacturers prefer beans from Ghana and Nigeria (Ivory Coast) because of their flavor. For top quality chocolate, South American, West Indian and other so-called flavor beans are often used. The pressing industry may select beans containing fat with higher melting points, such as those obtained from Malaysia. Regardless of the source, the same general processing techniques have been used.

In typical processing, the cocoa beans are harvested within a husk. Typically, the beans are dried in the fields, and dehusked. The beans are then subjected to various forms of heating, for example to intense infrared treatment, to pop the shells and in some instances for microbiological control. The shelled beans are generally referred to as cocoa nibs. The nibs are separated from the shells, for processing.

In typical processing operations, the nibs are roasted and in some instances subjected to dutching (alkali treatment or alkalization). The nibs are then ground, often with significant generation of heat.

The grinding is generally done to provide a fineness in the mass such that there will be no grittiness felt in the mouth, when eating resulting products containing the cocoa powder. The grinding is normally carried out in a series of mills; for example, pre-grinding to a size of less than 300 microns using a hammer mill, blade mill, disc mill or ball mill, followed by fine grinding using a triple disc mill or staged agitator ball mills. In general, sufficient grinding is conducted so that the resulting cocoa powder, after separation of the cocoa butter, will have a particle size of less than 1 wt. % retained on a 200 micron sieve and less than 30% retained on a 30 micron sieve. A typical average particle size would be between 2 microns and 20 microns.

Some manufacturers do not grind the nibs sufficiently to achieve this fineness, but rather engage in further refinement with later processing steps.

In general, the mass which results from grinding of the nibs is referred to as "cocoa mass" or "cocoa liquor". At room temperature, it is a thick solid mass; however, when heated above the melting point of the fat it forms a viscous, flowable slurry. Typical cocoa liquors contain about 50-58% fat and 42-50% powder (or remaining solids), by weight. The moisture content of cocoa liquor is generally at a maximum of about 2.5%. The pH is typically within a range of 5.2-6.0. The shell content, by weight, is generally no more than about 1.75%. The fat content of cocoa liquor is that portion generally referred to as "cocoa butter", after it has been separated from a remainder of the mass.

In general, about 30% of the world cocoa bean crop is converted into cocoa mass in a country where it is grown. This material is sometimes referred to as "original" liquor or mass. In later processing, such mass is not necessarily used alone, but sometimes is blended with mass or liquor from other sources.

In conventional "press" processing, cocoa liquor is mechanically pressed, to physically "squeeze" a portion of the fat out. In some instances the mass may be washed, to modify flavor or color. Generally up to about 80-85% of the fat content (of the 50-58%) can be removed from the cocoa mass, by mechanical pressing. This typically leaves a cake comprising about 10-20% butter (often 11-12%), by weight, the remaining comprising cocoa powder. Cocoa powder with a fat content of about 10% or below is often referred to as low-fat cocoa powder. The fat which is isolated by mechanical pressing is typically called "press butter".

The time and pressure it takes to remove the fat by pressing, to generate isolated press butter, increases substantially when the process is practiced to reduce the residue cake from about 20% fat content to about 11% fat content or lower. To reduce the fat content from 20% to about 10% may require twice as long of a processing (pressing) operation, as to reduce to 20%. Indeed, it may not be practical or even possible to get to less than about 5-9% fat, by weight, in the resulting cocoa cake, by conventional pressing techniques.

According to one report, whole cocoa beans have been processed without previous deshelling by continuous expeller techniques. The expeller cake and various resulting cocoa waste materials would then apparently be defatted by means of solvent extraction. The defatted residues from such a process, however, would be unlikely to be useful as food products, since they would contain large particles, such as shells and miscellaneous ditrious associated with the shells, which provide an unpleasant feel to the product. The isolated fat from such sources (which may include fats from portions of the cocoa bean other than just nibs) would also likely be of inferior quality.

Herein the term "cocoa butter" will be used to refer to the fat which is isolated from cocoa mass, during a separation process. Cocoa butter, which primarily comprises triglycerides of acids such as oleic acid, palmitic acid, and stearic acid, is a relatively valuable vegetable oil commodity. It is somewhat unique among vegetable oils, because of the combination of its taste, mouth feel and melt characteristics. These, in part, result from crystalline forms of some of its constituents, which provide for a sharp melting point just below body temperature. Also, the heat required to melt the crystals in cocoa butter results in a characteristic "cooling" sensation in the mouth, a highly desired quality of cocoa butters when used as food additives.

The remaining mass resulting from pressing of the cocoa mass, is referred to herein as "cocoa cake". As indicated above, with conventional press processing, the cocoa cake comprises about 10-20% cocoa butter, by weight. Again, this represents the (practical) maximum extent to which typical, conventional, mechanical pressing operations can remove cocoa fat from the cocoa liquor.

Typically, the resulting cocoa cake (after butter recovery) also comprises a useful commodity. It is generally ground into a powder and packaged for a variety of used. For example, cocoa powder made in this manner is used as a flavorant (and for color) in such materials as cake mixes, frostings, cookies, chocolate and drink mixes.

Conversion of the cocoa cake to the cocoa powder is no trivial matter. Due to the fat content, typically 10% or greater, the cocoa cake after pressing will be a clumped-together mass. To convert it to a powder, it must be cooled sufficiently and maintained sufficiently cool, while it is broken up; and, in some instances it must be further ground and sieved, again without generation of sufficient heat to reclump, due to the fat content. In general it must be maintained below about 27-300C., or the fat content will tend to melt and generate clumping.

Cocoa beans have been processed by pressing generally in the manner described above for many decades. As indicated, the two principal commodities obtained are: the cocoa butter isolated from the pressing steps; and, the cocoa powder, typically containing about 10-20% cocoa fat by weight.

In some applications, the fat content (10-20%) of the cocoa powder has been found undesirable. These are applications in which it is desired that the ultimate food product which is manufactured contain relatively low amounts of various added fats or oils. In recent years, then, processes of reducing the fat content of cocoa powder have been examined. In general, fat-free cocoa powders, i.e., cocoa powders containing no more than about 0.5% by weight cocoa butter, have been generated by extracting the cocoa powder obtained after pressing, via a supercritical carbon dioxide extraction. The supercritical extraction reduces the residual fat content of the cocoa powder, leaving the powder defatted.

SUMMARY OF THE INVENTION

Techniques for processing cocoa mass are described. In general, the techniques concern processing cocoa mass in a manner including steps of: (a) extracting cocoa mass with solvent to provide a solvent phase containing dissolved cocoa fat a residual solids phase comprising defatted cocoa solids; and, separating the solvent phase containing the dissolved cocoa fat from the solids phase. The process can be conducted in multiple stages of extraction/separation, with a final separation before isolation of product (s).

A variety of separation techniques can be applied. Certain preferred ones are described below.

In general, processing according to the present invention will be conducted under a pressure sufficient to allow for the solvent to be substantially in the liquid phase, while the process is conducted above the melting point of the cocoa fat. This will typically comprise processing at a temperature within a range of about 40-90° C., and a pressure within a range of about 16 psia to about 580 psia, depending on the particular solvent chosen. For example, when butane is used, the pressure will typically be within a range of about 50 psia to about 200 psia.

Although a variety of solvents may be used, in general it is foreseen that solvent or solvent mixtures selected from propane(s), butane(s) and/or pentane(s) will be preferred. With respect to quality of isolated butter, from the extraction/separation, the most preferred solvent identified thus far, as indicated by the experiments below is butane. Although various isomers can (in some instances) be used, generally the linear alkanes (n-propane, n-butane, n-pentane) are preferred.

Techniques according to the present invention can be readily applied to achieve, by extraction, removal of at least 95%, by weight, of all cocoa fat in the cocoa mass extracted. Indeed, they can be practiced to achieve extraction of at least 99% by weight, of all cocoa fat, in the cocoa mass, in many instances. In general, this requires appropriate amounts, or extent, of extraction. In some instances multiple stage extractions will be used to accomplish this. In at least some instances, such an extent of fat recovery can be achieved whether the fat content of the mass extracted is relatively high, i.e., greater than 45% (for example, 50-58%) or-relatively low, i.e, 20-45% (perhaps due to some preprocessing).

In general, cocoa powders (or isolated solids) resulting from preferred practices of the present invention will contain no more than about 2%, and typically no more than about 1%, cocoa fat, by weight. Fat contents of less than 0.5%, by wt., are achievable. These latter cocoa powders may be especially useful in preparing food products to be designated as "fat-free" under the NLEA (Nutritional Labeling Education Act).

In general, when multi-stage extractions are conducted, it is typically preferable to contact the most defatted cake with the freshest solvent. That is, the preferred multi-stage extractions are conducted in a somewhat countercurrent fashion or form. Preferred processes will be conducted in such a manner that the fat is extracted relatively efficiently, for example through control of conditions, and relative amounts of solvent and solid phase, such that a concentration of fat in the solvent phase after a step (for example, including multiple stages) of extraction is at least 15%, preferably at least 25%, and most preferably at least 35%, by weight.

In general, preferred processes according to the present invention will involve extractions at pressures greater than atmosphere, typically about 50 psia to 200 psia (for butane) or 50 psia to 400 psia (for propane).

According to the present invention, preferred products are provided. These may comprise, in part, good quality (or better) cocoa butter achieved by the techniques; and, desirable cocoa powder products.

DETAILED DESCRIPTION

Figure 1:
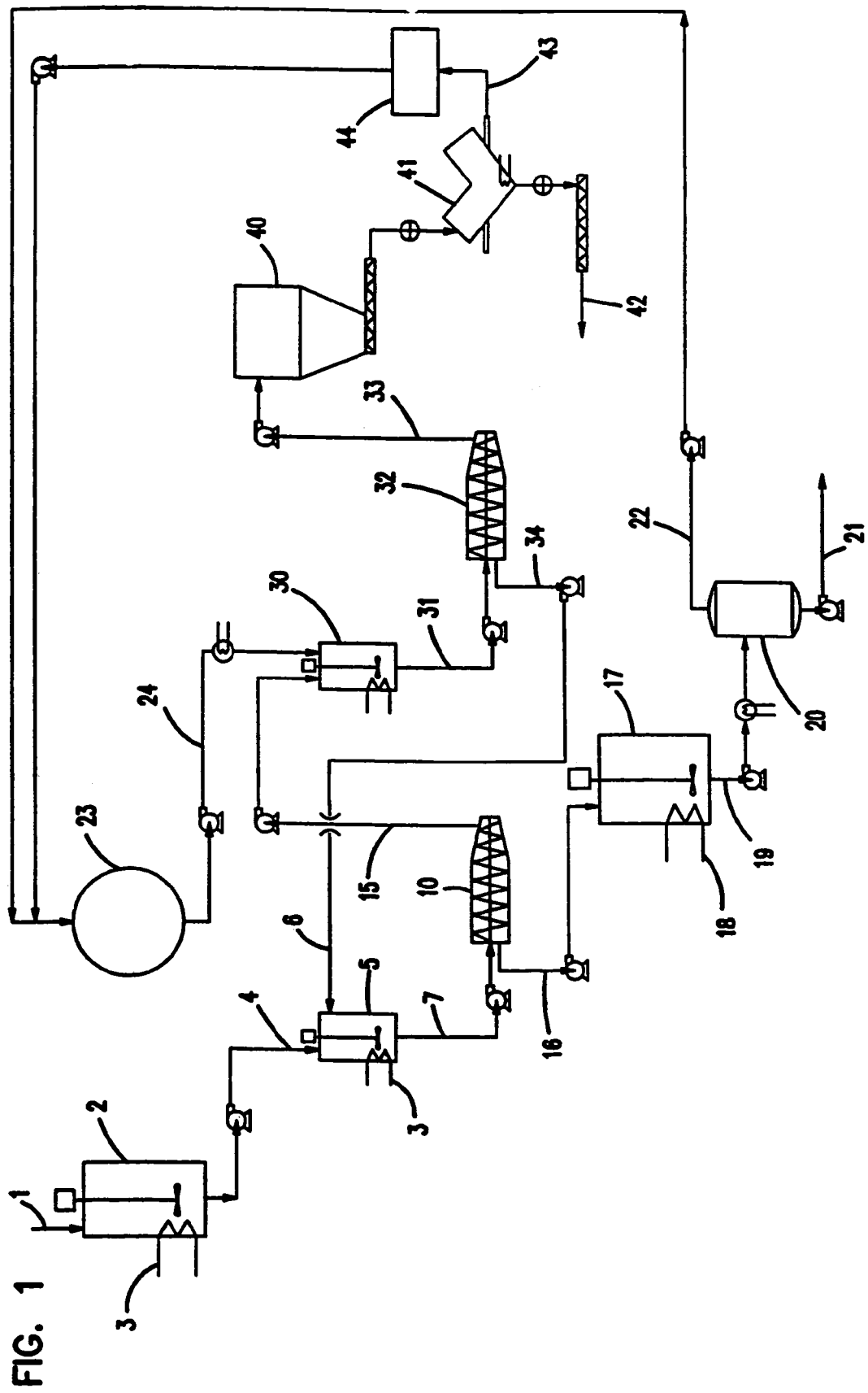
FIG. 1 is a schematic process flow diagram of a first process embodiment according to the present invention; and, FIG. 2 is a schematic process flow diagram of a second process embodiment according to the present invention.

I. Some Drawbacks to Conventional Cocoa Processing

As indicated above, in general many cocoa nib processing methods (to isolate high quality cocoa butter and cocoa powder) applied in the past have involved a step of mechanically pressing the cocoa mass, to generate cake and separated butter. While various designs of equipment have been developed for this, in general the equipment -has been constructed to operate at high pressures, on the order of about 6000-8000 psi. This has generally required relatively expensive, high-maintenance equipment.

Also, a pressing operation is typically a batch operation. As such, processing using a pressing operation is relatively slow. As indicated above, the rate is greatly affected by the extent to which the fat is to be removed from the cocoa mass. Efforts to obtain high cocoa butter yield, i.e., greater amounts of fat removal, require substantially greater amounts of time in the press. At some point, a practical limit is reached at which further fat removal cannot be readily accomplished. In many systems, this is at a fat content of about 11%. It may, in some instances, be as low as 9-10%. (Different varieties of cocoa plants generate beans of different propensities with respect to pressing.)

During the pressing operation, the resulting cake becomes relatively hot, typically about 80-110%° C. Cocoa processing has therefore generally required a step of warehousing the cake for a day or so, or use of heat removal systems, to cool the cake down sufficiently for further processing to be undertaken. A reason is that when the cake is hot, the residual fat melts and causes the cake to clump severely.

In general, the desirable cocoa or chocolate flavor and/or color, resulting from use of the cocoa powder, stems from the nonfat components of the cocoa powder. That is, the portion of the cocoa powder, i.e., 10-20% by weight, which comprises cocoa fat is not, generally, essential to the operation of the cocoa powder as a desirable food additive for cocoa flavor and/or color. However, the fat content represents an inconvenience due to its weight and physical characteristics. Also, it may provide undesired nutritional characteristics.

Supercritical extractions of press cake with $CO_2$, to reduce fat content in the cake, are undesirable, especially on a large scale, because relatively expensive high pressure equipment is needed, and large amounts of $CO_2$ are required. In addition, the relatively low solubility of fat in $CO_2$ (typically on the order of a few percent or less by weight), reduces substantially the desirability of the process. Also, $CO_2$ extractions (in practice) should be operated on a powder (not a liquor) because the high surface area is needed for a practical extraction. Thus, in general the physical characteristics of cocoa mass, coupled with the low solvency of $CO_2$, severely limits mass transfer of cocoa fats into the solvent phase and the utility of $CO_2$ extractions.

II. Some Desired Characteristics for Cocoa Processing

Due to the relative value of cocoa butter, by comparison to cocoa powder, it is desirable to recover as much of the fat content of a cocoa mass, as cocoa butter, as is reasonably and cost-effectively feasible. However, as indicated hereinbelow, the preferred characteristics of cocoa butter are such that while isolation of the cocoa butter is desirable, it must be controlled in a manner which results in a cocoa butter of certain preferred physical and chemical characteristics (i.e., quality).

Also, cocoa powder contains many components responsible for its desirable flavor and color. It is preferred that cocoa processing be conducted in a manner such that undesirable modifications in the cocoa powder, with respect to those, are not made. For discussions of the complex compositions of cocoa powder see: (1) Hashim, L., et al., "Extraction and determination of methylpyrazines in cocoa beans using coupled steam distillation-microdistillator", Food Research International, Vol. 27, p. 537-544 (1994); (2) Ghizzoni, C. et al., "Composition of Volatile Fraction of Industrial Chocolate", Italian Food and Beverage Technology, March 1995, p. 3-13; and, (3) Keme, T., "Heat Treatment of Cocoa—Problems and Controlling", The Manufacturing. confectioner, June 1994, p. 101-108. The complete disclosures of these three references are incorporated herein by reference.

It is also preferred to provide a low fat, and preferably fat-free, cocoa powder. These would be powders with a fat content of less than 2%, more preferably less than 1% and most preferably no more than (and indeed, less than) 0.5%, by wt.

It is preferred to develop processing in which, after the cocoa nib grinding process, the cocoa mass: (1) is not, again, heated to above about 90° C.; (2) is not treated with agents which will substantially modify the desirable characteristics of either the separated cocoa butter or the residual cocoa powder; and, (3) is not treated with agents that leave or cause a significant residue in the products.

Another preference is for a process which generates solids, from the separation step, in a form that: (1) does not require substantial periods of precooling prior to storage; (2) does not require substantial processing (grinding, etc. beyond simple break-up and sifting) to provide for a fine powder; and, (3) is storage stable, i.e., does not reclump substantially upon exposure to the types of temperatures encountered in storage and shipment.

These and other preferred characteristics and benefits are readily achievable with certain of the preferred techniques described herein.

III. General Characteristics of Processing According to the Present Invention

According to the present invention, a solvent extraction process is applied to cocoa mass, in order to provide for isolation of separated cocoa butter and cocoa powder therefrom. Preferably the extraction is conducted with a relatively low molecular weight (i.e., no more than 75 molecular weight-mw) hydrocarbon, or mixture of hydrocarbons. For example, propane(s), butane(s) and pentane(s) or mixtures thereof, can be used. Either linear or branched forms of those hydrocarbons are useable; however, the linear hydrocarbons are preferred. Preferably, the solvent is one in which the cocoa fats are soluble at least up to 10% by weight, more preferably at least 20%, and most preferably considerably more. Preferably saturated, unsubstituted alkane's are used. n-Butane is preferred, although n-propane is also desirable. The process may be conducted in a continuous or flow-through manner.

In some applications, a step of mechanical pressing or other preprocessing of the cocoa mass can be completely avoided. That is, cocoa fat is extracted directly from a cocoa mass, without any step of pressing of the mass. Advantages which result from this include: (1) final yield of cocoa butter (based on fat content of the mass) being increased over pressing techniques, because the extraction approach can be operated to provide for a higher amount of isolation of cocoa fat from cocoa mass than is practical-with mechanical pressing techniques; (2) avoidance of the substantial heating, associated with pressing; (3) avoidance of pressing equipment; and, (4) attainment of a low-fat, easy to handle, cocoa cake or powder. Techniques according to the present invention can be applied to remove 95% or more, and in many instances 99% or more, of the fat content of the cocoa mass. Thus, a recovery of 95% (indeed 99%) or more of cocoa butter during the extraction is feasible; and, a cocoa powder containing 2% or less (indeed, 1% or even 0.5% or less if desired) by weight fat is readily achievable.

In spite of the fact that an extraction (rather than simply mechanical processing) is conducted, the resulting isolated cocoa butter has been found to be desirable as a potential cocoa butter commodity. It demonstrates appropriate melting point characteristics, texture characteristics, etc., desirable for use in food processing. Indeed, depending on the source of cocoa beans, it can be isolated as a relatively high quality cocoa butter, as discussed below.

In general, the quality of cocoa butter obtainable with techniques according to the present invention, involving extraction, at least matches the quality of butter that can be isolated from the same cocoa mass material using pressing techniques, even though its selected yield may be higher. Thus, if a pressing technique to a 10-12% cake, conducted on a selected source of cocoa mass, results in a butter having a specifically defined d/q value or β% (d/q and β are discussed hereinbelow), practice of techniques according to the present invention involving separation of the fat by extraction will, if practiced on cocoa mass from the same source, typically provide a separated butter of at least the same d/q and/or β% values; and typically similar or better overall quality.

In addition, in spite of the fact that the cocoa mass is treated with an organic solvent for extraction, the resulting cocoa powder is found to possess desirable taste, mouth feel and related characteristics, to be useful and desirable as a food additive.

Herein, the term "cocoa mass" is used to refer to a mixture of cocoa fat and solids. A "cocoa mass", for example, would be ground cocoa nibs, before later processing, whether dutched or not. The term "cocoa liquor" is used herein to refer to cocoa mass which results from grinding cocoa nibs (whether dutched or not) but which has not been modified with respect to its fat content (typically 50% or greater). Thus, as the terms are used herein, a "cocoa liquor" is one type of "cocoa mass". The term "cocoa mass" is also intended to include within its scope the result of modifying cocoa liquor, for example compositions which have been modified by the addition of further cocoa butter or similar materials thereto. In addition, techniques according to the present invention can be applied on cocoa mass which has already been mechanically pressed (or otherwise modified—perhaps by centrifugation), for example to a fat content of 20%-30% or greater. Such a hybrid process (using both mechanical pressing (or centrifugation) and extraction for fat removal) may be desirable, in some instances, for reasons discussed generally below.

One reason that the preferred solvents are low molecular weight (i.e., no greater than 75 mw) nonpolar alkane solvents is that it has been found that such solvents readily extract the fat content, without extracting flavor compounds desirable in the powder. Preferably the solvent used in the extraction is one which can be easily separated from: (1) the extracted butter; and, (2) the recovered solids (powder). Preferably the solvent is also one that can be readily recovered. Most preferably, the solvent is a category I solvent approved by The Council of the European Committees (Jun. 13, 1988 Council Directive) for use in food processing. Food grade propanes and butanes generally meet all of the above stated preferences. The amount of solvent is preferably chosen such that, before isolation of the cocoa butter, the separated solvent phase will comprise at least 10%, preferably at least 25% and more preferably at least 35%, by wt., cocoa fat. This can be achieved with the preferred solvents identified.

Although not necessarily preferred, alternative solvent systems are possible. Mixed solvents, for example, may be useful in some instances. In general, however, it is foreseen that preferably at least 90%, by wt., (typically 95-100%) of the solvent used will comprise an unsaturated, unsubstituted, hydrocarbon or hydrocarbon (alkane) mixture comprising either butane, propane or a mixture thereof. Again, the straight chain hydrocarbons (n-propane, n-butane) will be preferred, and will preferably comprise at least 90%, by wt. (typically 95-100%), of the unsubstituted, unsaturated, alkane component or mixture. These solvent definitions are intended to allow for the presence of those contaminants (or other components) typically found in food grade propane and butane solvents. That is, such solvents may, in most instances, be used without further purification.

Although it is foreseeable that in some instances polar additives in the solvent mixture may be desirable, in general for processing to achieve both desirable cocoa butter products and desirable cocoa powder products, polar solvents will be avoided. This is because polar solvents may tend to modify the characteristics of the powder, by extracting polar components therefrom. Of course this latter could also result in a modification of the isolated cocoa butter.

It is foreseen that ether solvents, or mixtures of ethers and alkanes, may be usable to effect a desirable extraction. However, in general, ether solvents are not desirable in food processing operations.

Preferably the extraction will be performed at, or with the solids maintained at, a temperature above the melting point of the fat, i.e., above about 35° C., but less than 90° C. Operation above the melting point of the fat is desirable, to obtain high solubility (and miscibility) of the cocoa fat in the liquid solvent and to provide a desirable reduction in viscosity of the mixture. At about 90° C. or higher, undesirable heat effects in the products and excessive pressure requirements, may result.

In general, it has been found that the cocoa fat is completely miscible in the liquid solvent (alkane), provided the temperature is not too close to the critical temperature. For propane, this would limit the upper extraction temperature to about 70° C. For solvents such as butane, the preferred upper temperature, about 90° C., is, again, generally controlled by the heat sensitivity of the resulting products.

The operating pressure during the extraction should generally be at least equal to the vapor pressure of the mix system, in order to prevent boiling. For purposes of system design, one can use the vapor pressure of the pure solvent(s) at the temperatures of interest, as an indicator of the appropriate operating pressure.

Table I below reports: the vapor pressure at 54° C.; the critical temperature; and, the critical pressure for some of the solvents of interest.

TABLE I

| Solvent | Vapor Pressure @ 54° C. (psia) | Critical Temp. (° C.) | Critical Pressure (psia) |
| --- | --- | --- | --- |
| n-propane | 280 | 97 | 617 |
| n-butane | 80 | 153 | 530 |
| n-pentane | 30 | 197 | 484 |

In general, extractions according to the present invention can be operated in a number of stages. Typically, it is expected that they will be conducted with two to five stages, with the specific choice being based on net cost versus benefit. In general, increasing the number of stages allows a more concentrated solution of fat to be obtained, reducing operating costs.

Herein when reference is made to steps of: "extracting cocoa mass with a solvent"; and, "separating" a solvent phase from a solid phase, the intent is to refer to an extraction process which may be either one stage or multi-stage. When the process is multi-stage, the step of "extracting" could well comprise multiple steps of extraction/separation, due to the various stages. The "final" or "last" step of "separating" when used in this context, will generally refer to the separation which occurs after the last stage of extraction, i.e., the "separating" step or step of separation prior to isolation of fat and/or powder.

Table II below shows the calculated mass flows, and concentration of fat in solvent, for various numbers of theoretical stages in system based on 8,820 lbs./hour of cocoa liquor. The mass flows will hold for any of the preferred solvents. It is generally believed that any liquefied hydrocarbons at a temperature above the melting point of fat and at least 30° C. below the critical temperature of the hydrocarbon, is capable of dissolving the fat concentrations indicated in the Table.

TABLE II

|  | One Stage | Two Stages | Three Stages | Four Stages |
|---|---|---|---|---|
| Solvent Rate (lbs./hr.) | 260,000 | 21,800 | 9,500 | 6,400 |
| Fat Conc. (wt. %) | 1.8 | 23 | 40 | 53 |

In general, when cocoa liquor is prepared using conventional processing techniques, the solids of the cocoa liquor will have been ground to a mean particle size of about 7-10 microns. This is a relatively fine particle size. While it helps ensure rapid extraction, such a fine particle size can make separation of the solid phase from the extracted phase somewhat difficult.

In general, herein when reference is made to preferred steps of "separation" or "separating" to separate solids in solvent phase, prior to isolation of butter and/or powder, what is generally meant is a separation such that no more than about 6%, by wt., solids content is found within the separated solvent phase. Sometimes the percent by weight of solids carried in the separated solvent phase will be substantially less than this. However, because some of the solids are extremely fine, it is expected that typically some will still be found in the solvent phase after separation. These can generally be reduced to whatever level is desired, by filtration/clarification techniques operated on either: the solvent/fat phase prior to removal of the solvent; or, the isolated butter, after solvent has been removed. In general, such a filtration/clarification operation should be conducted sufficiently for the final isolated cocoa butter to be of the desired clarity, texture, etc.

In general, any separation technique which can accommodate the level of separation identified above, on the materials involved, is usable. It is foreseen that simple mixer/settler technology approaches, at least using conventional equipment, will generally not be preferred. This is because the solids phase resulting from mixing solvent and cocoa mass (which has previously been ground) will be sufficiently fine that settling will not be a fully desirable technique of separation. Thus, it is foreseen that preferred separation systems, with presently available equipment, will generally be one of two types: (1) decanter/centrifuge or hydrocyclone systems; or, (2) mixer/filter systems. In a detailed description below in connection with FIG. 1, a specific example using a decanter/centrifuge system is described. In connection with FIG. 2, a specific example illustrating a mixer/filter system is provided.

IV. Process Flow Diagrams for Typical Systems

Attention is now directed to FIG. 1. In FIG. 1, a process flow diagram is illustrated, showing processing of cocoa mass according to one of many possible applications of the present invention. Referring to FIG. 1, a cocoa mass feed into the system is illustrated at reference numeral 1. It is anticipated that in typical processing, the cocoa mass in feed 1 will comprise the result of grinding cocoa nibs, and will contain about 54% fat (50-58%) and 46% powder (42-50%), by weight. This feed could comprise, for example, cocoa nib material which has been ground in a conventional manner, but has not been pressed for mechanical removal of cocoa butter; i.e., it may comprise cocoa liquor as the term is defined herein. Of course the material may be the result of a dutching process, but there is no requirement of this.

It is foreseen that cocoa mass in line 1 could alternately comprise: (1) mixtures of unpressed cocoa liquor with other material; or, (2) cocoa mass which has been mechanically pressed (or centrifuged) for some removal of cocoa butter therefrom. Indeed, in some instances, techniques described herein could be applied to remove cocoa fat from a cocoa cake that has resulted from conventional mechanical pressing.

Referring to FIG. 1, cocoa mass at line 1 is shown directed into a tank 2. In tank 2, the cocoa mass is mixed and maintained liquefied. A steam circulation heating coil is indicated at 3, for application of heat to maintain the cocoa mass above the melting point of the cocoa fat. (The melting point for typical cocoa fats is around 27-33° C.) It is foreseen that typical cocoa masses will preferably be heated to temperatures within the range of 40-80° C., in tank 2, for convenient processing.

Referring still to FIG. 1, cocoa mass is shown directed through line 4 into mixing tank 5. In addition, solvent is directed into mixing tank 5, through line 6. The resulting solvent/cocoa mass mixture is shown removed from mixing tank 5 via line 7.

For the system shown in FIG. 1, the solvent/cocoa mass slurry of line 7 is directed into a separator system or arrangement 10 for separation of the solid and liquid Phases. A separator 10 may comprise, for example, a horizontal decanter centrifuge operated to separate the slurry into two phases comprising: (1) a hydrocarbon solvent phase containing dissolved fat; and, (2) a powder (solids) phase comprising resulting (or residual) cocoa solids with reduced fat content. The powder phase (solids phase) is shown removed from separator 10 via line 15, and the solvent phase is shown removed from separator 10 via line 16. The solvent phase is directed via line 16 into storage tank 17. Storage tank 17 is provided with a steam heating coil 18 to maintain solubility of the fat (butter). The solvent/fat is shown directed outwardly from tank 17 through line 19 into solvent separator 20. The solvent separator may comprise, for example, an evaporator, with the resulting butter (non-volatiles) shown drawn off in line 21, to storage. The solvent is removed from the solvent evaporator via line 22, and is directed into solvent storage tank 23, for recycling into the extraction. (Of course a condenser, not shown, in line 22 may be used.) If desired, either before introduction into the solvent separator, or after, the material may be clarified, for removal of small amounts of solids the rein. This would typically be accomplished by circulating the material through a clarifying filter.

Referring still to FIG. 1, the powder or solids phase of line 15 is shown directed into heated mixer 30. Solvent from tank 23 is directed, via line 24, into mixer 30, to conduct another stage of extraction. The resulting slurry is directed through line 31 into separator 32. The solid phase or powder phase from the separator 32 is removed via line 33; and, the solvent phase is shown removed via line 34. The solvent via line 34 is then directed into mixer 5 via line 6, for conduct of the first extraction stage described above. Separator 32 may also comprise a horizontal decanter centrifuge similar to separator 10.

Herein the first extraction to which solids directed in the system are subjected, will be referred to as the "first stage" of extraction. For the system shown in FIG. 1, this would be the extraction which occurs as a result of mixing in mixer 5, with the concomitant separation in separator 10. The next stage or second stage is the extraction which results from mixing in mixer 30, with follow-up separation at separator 32. The last time solvent is mixed with a solid phase, for extraction, will generally be referred to herein as the "final" or "last" stage of extraction. For the system shown in FIG. 1, this would comprise the mixing that occurs in mixer 30, with follow-up separation at separator 32.

The powder (solids) phase via line 33 is directed into a surge tank 40. From the tank 40, it is directed into a solvent evaporator 41, with the devolatilized powder product removed at line 42, and the collected volatiles directed via line 43 through compressor/condenser and into solvent tank 23. An advantage to the use of low molecular weight alkane solvents, such as propane and butane, is that the solids can be readily desolventized without application of steam to them. Typically good solvent removal will merely require some agitation with reduction in pressure, and in some instances heat, to flash off residual solvent. It is noted that in some facilities it will be desirable not to reduce the pressure, for solvent recovery, any more than is necessary to adequately desolventize, in order to facilitate solvent recovery.

Processing according to the present techniques is particularly advantageous with respect to the nature of the powder obtained. The powder is obtained in a relatively fine form. If it clumps somewhat, it can be easily broken and sifted, to produce a high quality, low fat, readily handleable, flowable, powder. Due to the low fat content resulting from the extraction, it is not a very temperature-sensitive material. That is, under ordinary storage temperatures, conveyance temperatures and use temperatures, it does not as undesirably reclump, etc. as powders containing 10% or more fat. Also, because it is obtained in a fine, or readily sifted, form from the extraction, grinding or other rigorous mechanical manipulations of the material may not be required.

In the following paragraphs, operation of the process in FIG. 1 will be further described, in connection with one possible set of flow parameters. In particular, cocoa liquor, comprising 54% fat and 46% powder, by weight, would be pumped as a liquid at 54° C. to the first mixing vessel. Approximately 8,820 lbs./hour of the liquor would be mixed with 21,750 lbs./hour of liquefied hydrocarbon phase (for example, butane solvent with some oil (or fat) therein) obtained as an output of second stage extraction, via line 6. The hydrocarbon would be expected to include about 400 lbs. of fat/hour, resulting from extraction in the second stage. The mixing vessel 5 would be selected to have a volume sufficient to provide for a residence time of about 2-10 minutes.

The slurry stream, taken from the outlet of the mixing vessel 5 via line 7, would-be separated into two phases in the horizontal decanter centrifuge tank. Other types of centrifuges may also be useful, as described in Perry's Chemical Engineer's Handbook, 6th Ed. (1984), pp. 19-89 to 19-103 (incorporated herein by reference). Equipment suppliers could include Bird Machine Co. (South Walpole, Mass.), Westfalia (Oelde, Germany); and Alfa-Laval (Warminster, Pa.). The separated liquid phase, containing about 19,905 lbs./hour of solvent and 4,722 lbs./hour of fat, would be directed to the fat recovery via line 16. The solid phase, containing 4,057 lbs./hour of cocoa solids and about 1,847 lbs./hour of solvent (and 440 lbs./hour of fat) is discharged from the separator 10 via line 15 into the second mixing vessel 30, where it would be contacted with 22,150 lbs./hour of solvent from the solvent working tank 23. The time and temperature of mixing in the second mixing vessel 30 would be analogous to the first mixing vessel. The outlet of the second mixing tank 30 would be directed to the second horizontal decanter centrifuge 32, where it would be separated into a liquid phase (fed to the first mixing vessel as described earlier) and a solids-rich phase, containing about 4,057 lbs./hour powder, 2,240 lbs./hour solvent and 40 lbs./hour butter.

The operating pressure of the system would be about 80 psia when the solvent is butane. The solids phase would be passed to a lower pressure system, where the solvent is vaporized and collected by recompression or cooling. The recovered powder would contain less than 1% fat.

In the fat recovery section, to which the fats would be directed via line 16, dissolved fat would be sent is to a lower pressure section for solvent recovery. For butane, suitable conditions would be a first stage solvent recovery at about 50 psia, with a condenser temperature of about 38° C. and a bottoms temperature of about 105° C. At those conditions, the solvent content of the fat phase would be reduced to about 10 wt. percent, while allowing recovery of the solvent by vaporization/condensation. The remaining solvent would be stripped and recovered under vacuum. The recovered fat could be deodorized in a conventional manner, for example by steam deodorization (short contact) and given a final filtration for clarity.

In some instances the solvent removal step and deodorization step could be combined.

Optionally, the mass could be first centrifuged to remove as much fat as possible, reducing the solvent requirements. A second alternative would be to use prepressed mass, which also has a lower fat content than cocoa liquor and thereby uses less solvent. This latter may be a particularly desirable approach for implementation in presently existing cocoa processing plants.

In particular, conventional processing plants generally comprise the result of substantial investments in pressing equipment. When such plants are combined with techniques according to the present application, in a hybrid process, the presses could still be used to some extent, for processing to remove some butter and to reduce cocoa mass content to some selected value, perhaps selected to be somewhere in the range of 15 to 45% (for example, 20-40%) fat, by weight. This could be conducted relatively rapidly, with conventional pressing equipment, for increased throughput. Further isolation of fat (as butter) and reduction in fat content of the resulting powder, would then be conducted with a follow-up extraction process. It is foreseen that in some instances this would be much more advantageous than the present practice of attempting to press the mass until the fat content of the resulting solids is reduced to below 20% (by wt.), especially when the reduction is to below about 15%.

Figure 2:
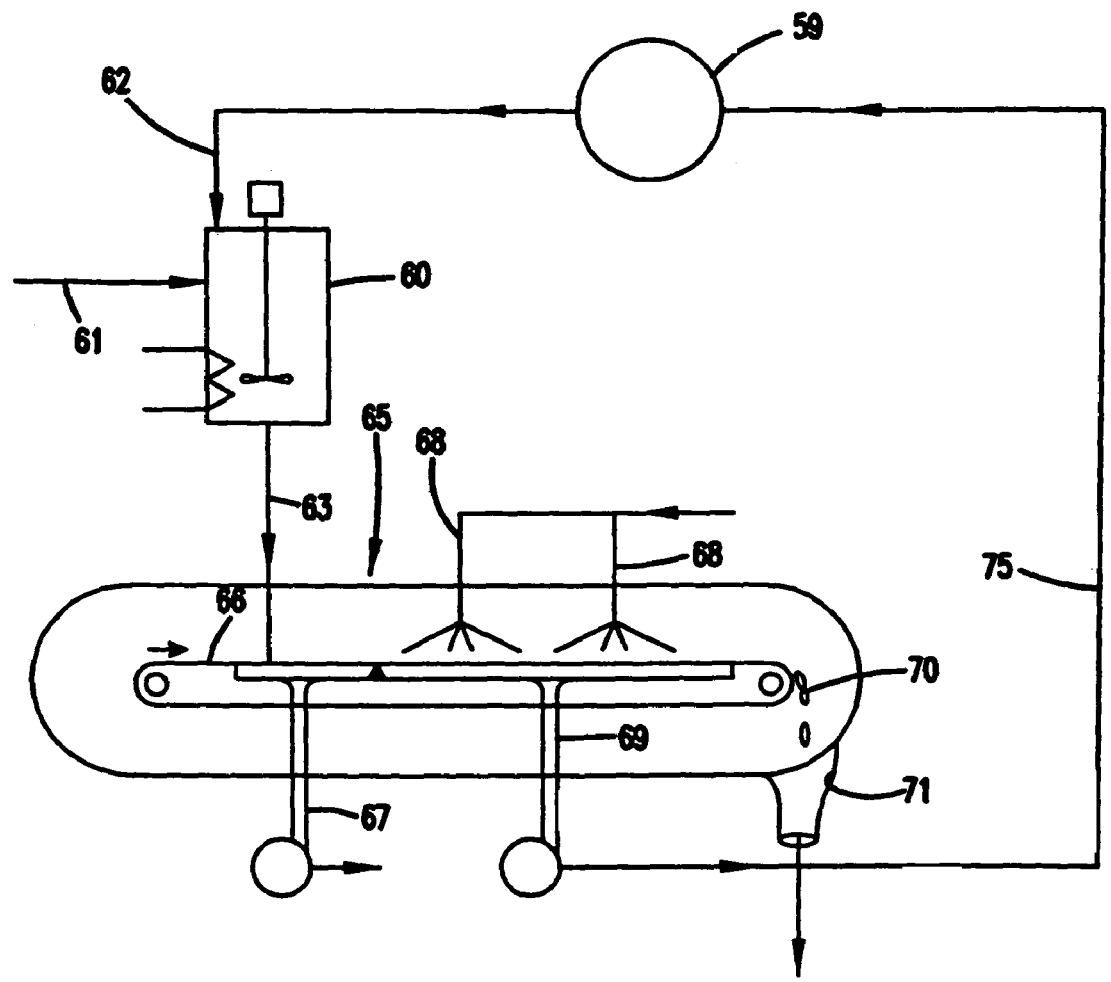

Attention is now directed to FIG. 2. In FIG. 2, a possible alternate filtration system is described. In the system of FIG. 2, cocoa mass would be pumped to a first mixing vessel 60, via line 61. In mixing vessel 60, the cocoa mass would be combined with solvent directed thereto via line 62. The resulting slurry would be removed from mixer 60 via line 63. It would be directed into a pressurized, contained, belt filter-system indicated generally at 65. In belt filter system 65, the slurry would be deposited onto belt 66. The primary liquid collected would be the product stream shown drawn off at 67. A fresh solvent wash would be directed in at lines 68, with removal at line 69. Defatted solid (i.e., cocoa powder) discharge would be as indicated generally at 70, with removal being via outlet 71.

The solvent wash removed via line 69 is shown cycled via line 75 for recycling into to mixer 60 via line 62. The fat-enriched solvent drawn off via line 67 can be directed into butter recovery processing, similar to that shown for line 16, FIG. 1. It could be directed into a clarifier, not shown. Clarified solvent would then be directed to butter recovery. Back wash from the filter would be recirculated to line 62.

The discharge via line 71 can be directed to powder (solids) processing similar to that described for the process in FIG. 1, through line 33.

The arrangement shown in FIG. 2 may be viewed as a multi-stage extraction arrangement, with a first stage indicated as occurring in mixer 60, with separation at line 67, and with the following stages occurring as a result of spray 68 and material draw-off at 69 and 71.

It is foreseen that the system of FIG. 2 could be operated, for example, on cocoa mass comprising 54% fat and 46% powder pumped into mixing vessel 60 at 54° C. Approximately 8,820 lbs./hour of the liquor would be mixed with about 8,300 lbs./hour of solvent obtained from the filter cake washing via line 69. It is anticipated that the system could be constructed so that such solvent would contain on average about 800 lbs./hour of fat.

The system could be configured so that the primary liquid collected at line 67 in a product stream would comprise about 4,723 lbs./hour of fat and 8,120 lbs./hour of solvent. As the cake moves down the belt, it would be washed with fresh aliquots of solvent, totaling about 8,820 lbs./hour.

It is foreseen that with such a system, after draining, the cake would still have a liquid content of about 10-20 wt. percent. After solvent recovery, the desolventized powder would contain less than 1 wt. percent fat.

If a system according to FIG. 2 were used, it is foreseen that the pressure inside the belt filtration system 65 will be maintained at a pressure high enough that the solvent after-passing through the filter is still at a pressure sufficient to prevent boiling. With butane, for example, the container vessel would be at about 120 psi with a 35 psi pressure drop across the belt, leaving the solvent collection trays at 85 psia.

V. Products

As indicated above, according to the techniques described herein, cocoa mass is processed to generate two isolated and desirable products: cocoa butter; and, cocoa powder.

In general, when preferred processes according to the present invention are practiced, a cocoa powder yield of 97% or greater from the cocoa mass extracted, can be defined having: a fat content of less than 2%, by wt. (or <1% or even <0.5% if desired); a particle size of 0./μ to 40μ; and, a mean particle size of about 6-10μ. This material will be found to have a desirable cocoa flavor, mouth feel, color, etc., for use as a food additive.

The cocoa butter isolated is also generally desirable. The principal component of cocoa butter is a triglyceride which consists of a backbone of glycerol esterified with three fatty acids, in particular, palmitic (P), oleic (O) and stearic (ST) acids.

The type of acid positioned at each of the three available sites in the triglyceride molecule is important. These are generally designated in a shorthand form of triglyceride nomenclature, with POST being different from PSTO, although the constituent acids in both of these triglycerides would be one-third palmitic, one-third oleic and one-third stearic.

The triglyceride POST belongs to the group of triglycerides that are typically called symmetrical monounsaturated, referred to as "SOS triglycerides", where "S" refers to a saturated acid residues and "O" to oleic acid. Such "SOS triglycerides" comprise about 80% (by wt.) of the triglycerides in cocoa butter.

The melting behavior of the fat (cocoa butter) is critical to its behavior in chocolate formulations. It is believed that it is affected substantially by the presence of "SOS triglycerides" in the butter. In very broad terms, for example, SOS triglycerides are solid at room temperature, whereas SOO triglycerides are more liquid at room temperature.

In Table III below, from *Industrial Chocolate Manufacture and Use,* 2d Ed., ed. by S. T. Beckett, p. 246, Blackie Academic Professional, Glasgow (1993), is provided the triglyceride composition of conventional cocoa butters from various sources. In Table IV, from the same source, some solid fat contents are provided.

TABLE III

Triglyceride composition of cocoa butters

|  | Brazil | Ghana (Ivory Coast) | Malaysia |
|---|---|---|---|
| SSS | 1.0 | 1.4 | 2.3 |
| SOS | 63.7 | 76.8 | 84.0 |
| SSO | 0.5 | 0.4 | 0.5 |
| SLiS | 8.9 | 6.9 | 6.8 |
| SOO | 17.9 | 8.4 | 5.1 |
| OOO | 8.0 | 6.1 | 1.3 |

S = saturated fatty acids (mainly palmitic and stearic);
O = oleic acid;
Li = linoleic acid

TABLE IV

Solid fat contents* (by pNMR) cocoa butters

| Temperature | | | | |
|---|---|---|---|---|
| (° C.) | (° F.) | Brazil | Ghana | Malaysia |
| 20 | (68) | 66.3 | 76.2 | 81.2 |
| 25 | (77) | 60.1 | 70.4 | 76.2 |
| 30 | (86) | 36.9 | 45.1 | 54.8 |
| 32.5 | (90) | 6.6 | 13.3 | 19.7 |
| 35 | (95) | 2.0 | 0.0 | 0.0 |

*Tempered at 26° C. (79° F.) for 40 h prior to solid fat content measurement.

It is significant that the cocoa processing according to the present invention does not appear to result in any negative impact on the butter, by comparison to conventional processing. Thus, if an appropriate quality cocoa nib is used, for cocoa butter production, techniques according to the present invention can be applied to obtain a butter of good (or preferred) quality.

In the experimental section below, some definitions are provided for functional or performance characterizations of cocoa butters (used by buyers of cocoa butter as a commodity). In general, d/q values are an indication of the hardness of the butter. Higher d/q values indicate harder butters with faster setting-times. Buyers of cocoa butter(s) for use in food processing will typically have a preferred d/q for their process or final product. With the techniques described herein, these preferences can readily be accommodated. Indeed, techniques according to the present invention can be readily applied to obtain butters exhibiting d/q values, as defined, within the range identified as satisfactory, within the range identified as very good, or within the range defined as exceptional, depending upon the cocoa mass selected. As the experiments show, preliminary indications are that in some instances d/q values greater than 0.18 or even greater than 0.20 are obtainable.

Higher beta ($\beta$) values are associated with a higher propensity for the butter to crystallize. Techniques according to the present invention can be utilized to provide butters with percent $\beta$ values of 15 or higher.

The above indicates that: (1) conventional "prime press butters" can be replaced with cocoa butters isolated according to the present invention, in many follow-up food processing operations; and, (2) the extraction techniques can be used to provide a cocoa butter of a predictable quality (and at least as good a quality as could have been obtained from the same raw material by pressing). Thus, prime press butter can be readily and completely eliminated from a recipe calling therefor, and can be replaced with an extracted cocoa butter according to the present invention.

It is noted that residual solvent levels of 5 ppm or less, preferably 3 ppm or less (and indeed, sometimes 1 ppm or less), will be preferred for both cocoa butters and cocoa powders. These levels can be readily obtained by the techniques described herein.

VI. Recipes

As indicated above, techniques according to the present invention are utilized to isolate: cocoa butter; and, low fat, even "fat-free", cocoa powder, from a cocoa mass. The cocoabutters may be utilized to replace cocoa butters in otherwise conventional recipes, to advantage. The cocoa powders can also be utilized to replace cocoa powders in conventional recipes.

Referring first to the cocoa powders, it is noted that cocoa powders isolated according to the present invention generally have a lighter appearance than conventional 10/12 powders (10%-12% fat by weight). The lighter color is generally a result of the lower fat content. The powders isolated after extraction, however, are generally acceptable, even in recipes calling for 10/12 powder, since the taste, texture and color characteristics desirable of the powder are not negatively affected by the removal of the fat content by the extraction techniques described herein. Indeed, generally flavor impact is noticed to be enhanced as a result of the loss of the fat content; and, the powder material may be easier to handle, again due to the fact that it does not clump when it becomes warm. Also, in general, the color difference is not observed once the powder is mixed into a food product.

Thus, cocoa powders having a fat content of 1% or less, especially 0.5% or less, when prepared according to the present invention, can be used in applications well beyond simply low fat applications. They may be desirably utilized to replace powders in almost any application.

In this section, some general recipes using materials according to the present invention are provided. From these recipes, broad applications of materials made according to the present invention will be used. For a general discussion of food processing using cocoa butter and/or cocoa powder, see: *Industrial Chocolate Manufacture and Use*, 2d Ed., ed. by S. T. Beckett, Blackie Academic and Professional, London, Chapter 15 (1993). This chapter is incorporated herein by reference.

In many instances, stable ingredients (or -selected stable ingredients) of the formulations can be blended and sold as premix, for use to make the products recited.

A. Milk Chocolate.

Milk chocolates generally include a blend of: sugar; cocoa butter; milk solids (for example, milk powder); chocolate liquor; lecithin; and vanillin. A typical milk chocolate formulation, by weight, is as follows:

| Typical Milk Chocolate | |
|---|---|
| Sugar | 51.3 |
| Cocoa butter | 20.1 |
| Whole milk powder | 15.1 |
| Chocolate liquor | 13.0 |

| Typical Milk Chocolate | |
|---|---|
| Lecithin | 0.45 |
| Vanillin | 0.05 |
| | 100.00% |

It is foreseen that cocoa butters according to the present invention can be used to replace the cocoa butter component, in such typical milk chocolate formulations.

B. Semisweet Chocolate.

A typical semisweet chocolate is a blending of the following materials: sugar; chocolate liquor; cocoa butter; lecithin; and vanillin. The following table gives a typical semisweet chocolate formulation, by weight:

| Typical Semisweet Chocolate | |
|---|---|
| Sugar | 50.3 |
| Chocolate liquor | 38.3 |
| Cocoa butter | 10.9 |
| Lecithin | 0.45 |
| Vanillin | 0.5 |
| | 100.00% |

It is foreseen that cocoa butter isolated according to the present invention can be utilized to replace cocoa butter in such a formulation.

C. Cocoa Confectionary.

A typical cocoa confectionary comprises a blend of: sugar; partially hydrogenated vegetable oil; 10/12 cocoa powder; milk; whey powder; lecithin; and vanillin. A formulation for a typical cocoa confectionary, by weight, is as follows:

| Typical Cocoa Confectionary | |
|---|---|
| Sugar | 48.0 |
| Partially hydrogenated vegetable oil (cottonseed, soybean) | 29.5 |
| Cocoa powder nat. 10/12 | 9.0 |
| Non-fat dry milk | 7.0 |
| Whey powder | 6.0 |
| Lecithin | 0.45 |
| Vanillin | 0.05 |
| | 100.00% |

It is foreseen that a cocoa powder prepared according to the present invention, including less than 2% by weight fat, and indeed in some instances no more than 0.5% by weight, can be used to replace the cocoa powder of such a confectionary. In some instances, a minor lessening in the presence of the cocoa powder by weight, in the formulation, may be desirable due to the reduction of fat content and, as a result, enhancement of the cocoa flavor. This will primarily be a matter of taste.

D. Chocolate Ice Cream.

Chocolate ice cream generally comprises a blend of: cream; milk; whey; sugar cane liquid; corn syrup; cocoa powder (22/24% fat, for example); and water. A typical formulation for a chocolate ice cream product, using 22/24 Aristocrat™ cocoa powder as the cocoa ingredient, is listed below:

| Typical Chocolate Ice Cream using Gerkens 22/24 Aristocrat™ Cocoa Powder | |
| --- | --- |
| Cream | 22 |
| Skim milk powder | 8 |
| Whey powder | 2 |
| Sugar cane liquid (BRIX .6734) | 21 |
| Corn syrup 36DE (BRIX .80) | 1 |
| Stabilizers | 0.5 |
| 22/24 Aristocrat ™ | 3.5 |
| Water | 42 |
| | 100.00% |

It is foreseen that the higher fat 22/24 Aristocrat™ powder (Wilbur Chocolate Co., Lititz, Pennsylvania) can be replaced with a cocoa powder isolated according to the present invention, even one having less than 2% by weight fat therein. Some reduction in the cocoa powder presence of the formulation may be desirable, since powders according to the present invention provide for enhanced flavor impact, due to the reduction in fat content. This will primarily be a matter of taste.

E. Chocolate Milk.

A chocolate milk formulation generally comprises, in addition to the milk, a blend of: fat; MSNF; sucrose; cocoa powder; stabilizer; and vanillin. A typical formula for a chocolate milk formulation, disregarding milk content, would be as follows:

| Typical Chocolate Milk Formulation | |
| --- | --- |
| Fat | 1-3 |
| MSNF[1] | 0.5-1 |
| Sucrose | 7-9 |
| Cocoa | 1-3 |
| Stabilizer | 0.2 |
| Vanillin | 0.02-0.05 |

[1]milk solids, non-fat

It is foreseen that a cocoa powder according to the present invention can replace the conventional cocoa used in such formulations. Again, since higher flavor impact will result, due to the lesser fat content, slightly lower amounts of cocoa powder may be desirable in the formulations. This will primarily be a matter of taste.

F. Chocolate Frosting.

Typical chocolate frosting formulations comprise a blend of: sugar; shortening; water; cocoa powder; salt; and vanillin. A formula for such a formulation, by weight, would be as follows:

| Typical Chocolate Frosting Formulation | |
| --- | --- |
| Sugar | 45-60 |
| Shortening | 10-20 |
| Water | 10-20 |
| Cocoa powder | 4.5-6.0 |
| Salt | trace |
| Vanillin | trace |
| | 100.00% |

It is foreseen that a cocoa powder according to the present invention, containing 2% or less, and even 0.5% or less, by weight, fat, can be used to replace the cocoa powder in such formulations. In some instances, a slight reduction in the amount of cocoa powder presence may be desirable, since cocoa powders according to the present invention are generally enhanced with respect to cocoa flavor, by comparison to conventional powders, due to reduction in fat content. This latter will primarily be a matter of test.

G. Chocolate Syrup.

A chocolate syrup formulation generally comprises a blend of: cocoa powder; sugar; water; salt; and vanilla. Some typical formulae for a chocolate syrup formulation would be as follows:

| Chocolate Syrup -- Formula I | |
| --- | --- |
| 10 lbs. | Medium Dutch cocoa powder |
| 35 lbs. | Granulated sugar |
| 8 lbs. | Corn syrup solids |
| 15 lbs. | Water |
| 1 oz. | K-Sorbate |
| 1 oz. | Salt |
| 1 oz. | Vanilla |
| 1 oz. | Stabilizer |

Typically the materials in Formula I would be blended and used as follows:

1. Blend all dry ingredients except preservative(s) and vanilla.
2. Heat water to about 160° F., add dry ingredients from #1 agitating continuously. After all the powder is wet, increase heat to about 180-200° F. and hold about 15 minutes. Turn off heat and start cooling.
3. When temperature is about 100-110° F., add preservative and vanilla.
4. Homogenize, can and cool.

| Chocolate Syrup -- Formula II | |
| --- | --- |
| 10 lbs. | 10-12% Medium Dutch cocoa powder |
| 35 lbs. | Granulated sugar |
| 15 lbs. | Corn syrup solids |
| 31 lbs. | Water |
| 1 oz. | K-Sorbate |
| 1 oz. | Salt |
| 1 oz. | Vanilla |
| 1 oz. | Stabilizer |

Typically the materials in Formula II would be blended and used as follows:

1. Blend all dry ingredients except K-Sorbate.
2. Heat water to about 160° F., add dry ingredients from #1 agitating continuously. After all the powder is wet, increase heat to about 180-200° F. while agitating and hold about 15 minutes. Turn off heat and start cooling.
3. Start adding corn syrup while agitating. When temperature is about 100-110° F. add preservative and vanilla.
4. Homogenize, can and cool.

| Chocolate Syrup -- Formula III | |
| --- | --- |
| 325 lbs. | Water |
| 100 lbs. | Medium Dutch cocoa |

-continued

Chocolate Syrup -- Formula III

| | | |
|---|---|---|
| 445 lbs. | Sugar | |
| 230 lbs. | Invert sugar | |
| 1 lb. | Salt | |
| 0.3 lbs. | Vanillin | |

Typically the materials in Formula III would be blended and used as follows:
1. As water is being agitated and heated, add the cocoa mixed with some of the sugar and then the salt and the rest of the sugar. Heat to 180° F.
2. Add the invert sugar syrup.
3. Cook to 220°-225° F.
4. Turn off heat and add vanillin.
5. Homogenize, can and cool.

It is foreseen that a cocoa powder according to the present invention can replace the conventional cocoa used in such formulations. Again, since higher flavor impact will result, due to the lesser fat content, slightly lower amounts of cocoa powder may be desirable in the formulations. This latter will primarily be a matter of taste.

H. Chocolate Cake.

A chocolate cake formulation generally comprises a blend of: shortening; sugar; eggs; vanilla; flour; baking soda; salt; cocoa; and sour milk. A typical formula for a chocolate cake formulation would be as follows:

Typical Chocolate Cake Formulation

| Ingredient | Measurement 9" × 13" or two 8" round | % Formula | Batch Size 1 9" × 13" or two 8" round | Batch Size 2 8" round |
|---|---|---|---|---|
| Shortening | ½ cup | 6.73 | 95.4 g | 47.70 g |
| Sugar | 1¾ cup | 25.96 | 368.11 g | 184.05 g |
| Eggs | 1 | 3.35 | 47.5 g | 23.75 g |
| Vanilla | 1 tsp. | 0.16 | 2.25 g | 1.125 g |
| Flour | 2½ cup | 27.17 | 385.25 g | 192.62 g |
| Baking soda | 2 tsp. | 0.49 | 7.00 g | 3.50 g |
| Salt | ½ tsp. | 0.16 | 2.25 g | 1.125 g |
| Cocoa powder | 6 Tbsp. | 2.77 | 39.26 g | 19.63 g |
| Sour milk* | 2 cups | 33.21 | 471.00 g | 235.50 g |
| Total | | 100 | 1418.02 g | 709.01 g |

*4 Tbsp. vinegar + milk to 2 cups = sour milk

Typically the materials would be blended and used as follows:
1. Preheat oven to 350° F.
2. Cream together shortening and sugar on low speed.
3. Add egg and vanilla, beat 2 minutes on medium speed.
4. Blend flour, baking soda, salt, and cocoa and sift.
5. Add dry ingredients to creamed ingredients alternating with sour milk.
6. Pour into greased pan.
7. Bake 30-40 minutes or until done.
8. Cool on wire rack.

It is foreseen that a cocoa powder according to the present invention can replace the conventional cocoa used in such formulations. Again, since higher flavor impact will result, due to the lesser fat content, slightly lower amounts of cocoa powder may be desirable in the formulations. This latter will primarily be a matter of taste.

I. Chocolate Brownies.

A chocolate brownie formulation generally comprises a blend of: butter; sugar; vanilla; eggs; cocoa; flour; and salt. A typical formula for a chocolate brownie formulation would be as follows:

Typical Chocolate Brownie Formulation

| Ingredient | Measurement | % Formula | Batch Size 1 9" × 13" | Batch Size 2 8" × 8" |
|---|---|---|---|---|
| Butter | ½ cup | 11.97 | 113.00 g | 56.50 g |
| Sugar | 2 cups | 44.56 | 420.70 g | 210.35 g |
| Vanilla | 1 tsp. | 0.24 | 2.25 g | 1.125 g |
| Eggs | 4 | 20.12 | 190.00 g | 95.00 g |
| Cocoa powder | (see batch columns) | 6.67 | 63.00 g | 31.50 g |
| Flour | 1 Cup | 16.32 | 154.10 g | 77.05 g |
| Salt | ¼ tsp. | 0.12 | 1.125 g | 0.56 g |
| Total | | 100 | 944.20 g | 472.10 g |

Typically the materials would be blended and used as follows:
1. Preheat oven to 350° F.
2. Melt butter.
3. Add cocoa, beat until well blended on low speed.
4. Beat eggs and salt together.
5. Add sugar and vanilla to eggs and beat.
6. Add egg and sugar-mixture to:butter cocoa mixture and blend on low speed.
7. Add flour and blend on low speed.
8. Pour into greased pan.
9. Bake 25 minutes.

It is foreseen that a cocoa powder according to the present invention can replace the conventional cocoa used in such formulations. Again, since higher flavor impact will result, due to the lesser fat content, slightly lower amounts of cocoa powder may be desirable in the formulations. This latter will primarily be a matter of taste.

EXPERIMENTAL

Summary of Methods

Natural African cocoa liquor and dutched (alkalized) cocoa liquor (in drop form, from Wilbur Chocolate Co. of Lititz, Pa.) were processed batchwise using liquefied propane. Natural African liquor was also processed batchwise with liquefied butane. The cocoa butter content of the liquors, before processing, was around 54%.

The butane and propane extractions were conducted in two steps, using solvent to feed ratios of 2:1, at a temperature of 125° F. and reactor pressures around 100 psi for butane, and 200 psi for propane. The contact time of solvent and liquor was approximately 45 minutes for each stage. The extracted butter and fat-free solids streams were desolventized by holding the materials at 150° F. and atmospheric pressure for one hour.

The cocoa butter isolates were analyzed using IOCC cooling/solidification method 110, and differential scanning calorimetry (DSC). Solvent-extracted fat-free powders were analyzed for residual fat, residual solvent, particle size distribution (Coulter counter), pH, color and flavor.

IOCC Cooling Method

This method (published in "Analytical Methods of the Office International du Cacao et du Chocolate" (1988), Bioggio, Switzerland; incorporated herein by reference) involves analysis of the behavior of cocoa butter while cooling and thus serves as an important predictor of cocoa butter behavior in applications. The latent heat of triglyceride crystallization is measured during solidification of the finished product. A sample of cocoa butter is thermally conditioned, placed into a Shukoff flask and cooled in a 0° C. water bath. The temperature of the butter is recorded over time. The rise in temperature ($\Delta T$) reflects the latent heat of crystallization over time interval ($\Delta t$). Cooling curves yield d/q values which represent the ratio $\Delta T/\Delta t$. The total time for crystallization is also important, because the latent heat of crystallization melts some of the cocoa butter mass. The more time required to recrystallize, the softer the butter and the more difficult it is to process. In general, higher d/q values indicate harder butters. Ivory Coast butters typically exhibit d/q values in the range of. 0.10-0.18 values.

Differential Scanning Calorimetry (DSC)

With this method, one analyzes the amount of crystal polymorphism and/or self-fractionation in cocoa butter. Cocoa butter is conditioned and slowly melted in a DSC using a pre-programmed heating profile. Heat flow (enthalpy $\Delta H$) is measured at a given temperature. Peaks of heat flow within a DSC curve depict melting of triglyceride crystals. By definition, $\beta$ and $\beta'$ crystals occur in narrow regions of the temperature continuum. Integration of their respective peaks allows one to quantify the total $\beta$-$\beta'$, which is expressed as a percentage of the total butter (% $\beta$). The other significant crystal types are $\alpha$ and $\gamma$. Higher % $\beta$ values indicate faster rates of crystallization.

For the measurements reported herein, a proprietary variation of the method reported in *Lebensm-wiss. Technol.* (1982), Vol. 15, pp. 195-198 by Merken, Vaeck & Dewulf was used. The published method cited (incorporated herein by reference) is adequate.

Total $\beta$-crystal is largely influenced by country of origin. Press butters typically fall in the range of 15-60. Butters isolated with the techniques described herein typically fall within the range of $\beta$ values.

Particle Size Analysis—Coulter

The Coulter LS 230 (available from Coulter Corp., Miami, Fla.) determines the size distribution of cocoa particles. Actual size is measured with a laser defraction analyzer based on Fraunhofer's theory of light diffraction. Particle sizes under 0.4 microns are determined by polarization intensity differential scattering. Samples of cocoa are mixed with 2-propanol and sonicated to break up agglomerates. Laser scans produced a defraction pattern, and the particle "size" of the sample is the value at the 80th percentile.

Sieve Residues

The sieve residue wet method gives the percentage Of cocoa powder that passes through a 200 mesh (75µ) screen. Cocoa powder is suspended in hot water, sieved and passed through the screen. Residue (>75µ) is dried with acetone, defatted with petroleum ether, redried and finally weighed.

RESULTS

Cocoa Butter

Propane- and butane-extracted cocoa butters exhibited cooling curve and DSC characteristics equivalent to, or better than, acceptable African (Ivory Coast) press butters.

As noted above, cooling curves by IOCC reflect the rate of crystallization of molten cocoa butter triglycerides. In general, short crystallization times are preferred and correspond to higher d/q values. By way of reference, d/q values (of cocoa butter) between 0.10-0.13 are generally considered satisfactory, 0.13-0.17 are generally considered very good; and values of >0.17 are considered exceptional. Pure prime press butters (PPB) of Ivory Coast origin (commercially available) rarely exceed 0.175.

The cocoa butter resulting from extracting African natural cocoa liquor using propane yielded a d/q value of 0.16 (very good). The butter recovered from dutched liquor using propane gave a d/q value of 0.15 (also very good). Cocoa butter extracted from African natural liquor using butane yielded an unprecedented d/q value of 0.21.

Differential scanning calorimetry provides information on crystal structure of cocoa butter triglycerides. For African press butters, % $\beta$to values of 30.0 or greater are considered good. The propane-extracted African natural liquor and dutched liquor produced butters with 29.7 and 33.4% $\beta$, respectively. Butane-extracted African natural liquor yielded a butter with 40.0% $\beta$. While the cooling curve and DSC tests analyze different attributes, the values for the butane-extracted butter are directionally consistent insofar as predicting butter functionality.

All of the butte extracts tested had residual solvent levels under 5 ppm. Indeed, they were less than 1 ppm.

The Fat-Free Cocoa Powder

Propane and butane extraction of the natural and dutched liquors produced cocoa powders with zero (i.e., no greater than 0.5%) residual fat and less than 5 ppm residual (indeed, less than 1 ppm) solvent. Residual fat content was determined using three methods: soxhlet extraction; supercritical fluid extraction with carbon dioxide; and NMR. The NMR-method was found to be less accurate in quantifying low levels of residual fat. Residual propane and butane solvent (head space recovery) were analyzed by gas chromatography.

The fat-free powders resulting from the processes tested exhibited particle size distributions identical to standard cocoa powders. The latter contained 10-12% fat after liquor is pressed and the resultant cake milled and classified. Particle sizes ranged between 45 microns (µ) on the high end to 0.1µ on the low end, with a mean size of 8.2µ and a median size of 6.6µ. The fat-free powders match the size specifications for standard 10/12% fat powders in that 80% of the particles were smaller than approximately 12.5 µ and greater than 99.5% of the same material passed through 200 mesh screen (particles <75µ) Particle size was found to have been controlled during grinding of the nibs to form liquors, so the particle size was maintained downstream irrespective of the butter extraction (solvent vs. press).

The pH of the tested fat-free natural powder resulting from the processing according to the present invention was 5.6 (10% slurry in water), and the fat-free dutched powder had a pH of 7.0. The color of the fat-free powders was somewhat lighter than their counterparts that contain 10-12% fat, when-made via conventional-processing. The apparent disparity is related to the interaction of light with fat, and it disappears when the materials are suspended in water or blended in a confection or batter at equivalent levels of nonfat solids. The fat-free powders resulting from processing according to the present invention had comparable bitterness and astringency flavor characteristics to standard powders, when the products were adjusted for fat content. A trained sensory panel reported the flavor differences between the fat-free powders made by processing according to the present invention, and their standard counterparts containing 10-12% fat as "negligible". The differences were within the range of typical product variability versus production batches.

What is claimed is:

1. A cocoa powder consisting essentially of ground cocoa nibs having a fat content of no more than about 0.5 wt. %; a mean particle size of about 6 to 10 microns; and a residual hydrocarbon solvent level of no more than about 3 ppm.

2. The cocoa powder of claim 1, wherein the residual hydrocarbon solvent level is 1 part per million or less.

3. The cocoa powder of claim 1, wherein the hydrocarbon solvent is selected from the group of propane, butane, pentane and mixtures thereof.

4. The cocoa powder of claim 1, wherein the hydrocarbon solvent comprises n-butane.

* * * * *